US008451344B1

(12) United States Patent
Karakotsios

(10) Patent No.: US 8,451,344 B1
(45) Date of Patent: May 28, 2013

(54) ELECTRONIC DEVICES WITH SIDE VIEWING CAPABILITY

(75) Inventor: Kenneth M. Karakotsios, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 266 days.

(21) Appl. No.: 13/071,096

(22) Filed: Mar. 24, 2011

(51) Int. Cl.
*H04N 5/228* (2006.01)
*H04N 5/232* (2006.01)

(52) U.S. Cl.
USPC .................................. 348/222.1; 348/211.11

(58) Field of Classification Search
USPC ................. 348/222.1, 211.99, 211.1–211.14, 348/143; 455/556.1, 556.2
See application file for complete search history.

(56) References Cited

U.S. PATENT DOCUMENTS

| | | | | |
|---|---|---|---|---|
| 7,626,569 | B2 * | 12/2009 | Lanier | 345/156 |
| RE42,639 | E * | 8/2011 | Anderson | 348/272 |
| 8,243,967 | B2 * | 8/2012 | Kirkeby et al. | 381/300 |
| 2010/0103244 | A1 * | 4/2010 | Brandsma et al. | 348/14.08 |
| 2011/0164105 | A1 * | 7/2011 | Lee et al. | 348/14.02 |
| 2012/0062729 | A1 * | 3/2012 | Hart et al. | 348/135 |

* cited by examiner

*Primary Examiner* — Aung S Moe
*Assistant Examiner* — Amy Hsu
(74) *Attorney, Agent, or Firm* — Novak Druce Connolly Bove + Quigg LLP

(57) ABSTRACT

An electronic device can utilize one or more image capture elements on the sides or edges of the device to capture image information in a way that is more discrete than for conventional devices with a single camera on a back of the device. Further, the ability to utilize cameras on multiple sides of the device provides enhanced capability. Devices can utilize information such as the current orientation of a device to select one or more appropriate image capture elements to activate at a given time. The image information can be used to provide information about the user's surroundings, such as the names of people in a meeting, without making it obvious that the user is trying to determine that information.

27 Claims, 9 Drawing Sheets

ELECTRONIC DEVICES WITH SIDE VIEWING CAPABILITY

BACKGROUND

People are utilizing portable electronic devices for an increasing number and variety of tasks in a variety of different settings. In some instances, users might want to capture information about products or people by using a camera of the electronic device. When the device is a smart phone or tablet computer that has a single camera on the back of the device, for example, a user typically will have to hold the device "upright" between the user and the object for which an image is being captured by the device. While such usage might be sufficient for capturing single images when used like a camera, there are an increasing number of tasks that utilize captured image information where it can be less than desirable to have to hold the device in such an orientation, particularly if the user is surrounded by other people and/or has to hold the device in that orientation for an extended period of time.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments can overcome these and other deficiencies in existing approaches to image capture using an electronic device. In particular, various embodiments utilize one or more image capture elements positioned on sides, edges, corners, and/or other such locations on an electronic device in order to provide, for example, less intrusive image capture. Further, the ability to have multiple cameras on the sides or edges of a device offers enhanced functionality in many situations.

In some embodiments, an electronic device has multiple imaging elements that can be activated. A user can manually select at least one imaging element to use for a specific task, or an application might specify which imaging element(s) to use. In at least some embodiments, an orientation determining element can be used to determine a current orientation and/or change in orientation of an electronic device. Based at least in part upon the determined orientation information, the device can automatically select at least one imaging element to use for image capture. In some embodiments, a user, application, or other source can specify image capture elements to use in specific orientations.

In some embodiments, image information can be continually or at least periodically captured using at least one image capture element. As an orientation of the device changes or as objects move, for example, the activated image capture element can change. In certain embodiments, a device can track the movement of an object or person even if the device does not move, where the image capture elements can be selectively activated to track such movement. If two image capture elements are required to capture the necessary information, that information can be stitched together or otherwise combined as necessary.

Various other applications, functions, and advantages are presented below with respect to the various embodiments. It should be understood that the description and figures provide a number of examples, but the alternatives and variations possible within the scope of the various embodiments are not fully described. These alternatives and variations, however, would be apparent to one of ordinary skill in the art in light of the teachings and suggestions contained herein. It should be understood that reference numbers are carried over between figures to identify similar elements for purposes of simplicity of explanation alone, and this should not be interpreted as limiting the scope of the various embodiments or showing various options as part of the same embodiment.

Figure 1A:
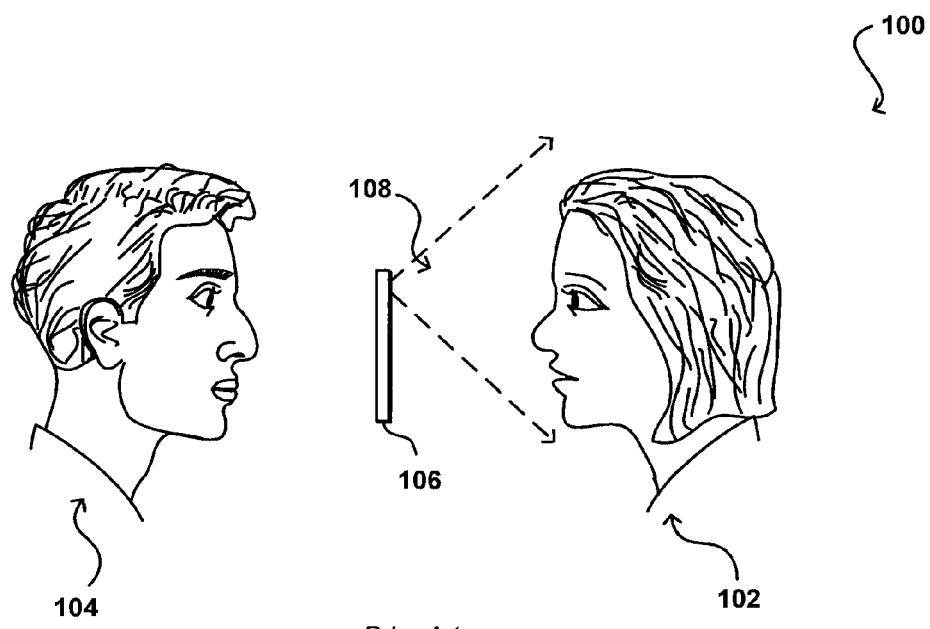
FIGS. 1(a) and 1(b) illustrate example orientations at which devices can capture image information in the prior art and in accordance with various embodiments.

FIG. 1(a) illustrates an example situation 100 wherein a user 104 is using an electronic device 106 to capture a image information about another person 102. Using a conventional electronic device with a camera on the back of the device, the user must hold the device 106 "up" between the user and the person 102 in order for the viewable range 108 of the camera to include the other person 102. In at least some situations, such requirements can be intrusive, annoying, or at least inconsiderate, as the device might block the person from seeing the user, or the person can be distracted by having the device held up towards that person's face.

Further, in at least some cases the user 104 might not want to make it obvious that the other person 102 user is being imaged. For example, the user 104 might be in a business setting and might be talking with a person 102, but the user might not be able to remember that person's name. The user might want to use the electronic device to capture an image of that person and perform image analysis to determine the identity of that person, such that the device can display or otherwise provide the user with information about that person, such as name and title. If the user has to use a camera on the back of the device as in FIG. 1(a), it will be difficult to discretely capture image information about the other person, particularly when the image recognition algorithm requires that the other person be facing the device.

Figure 1B:
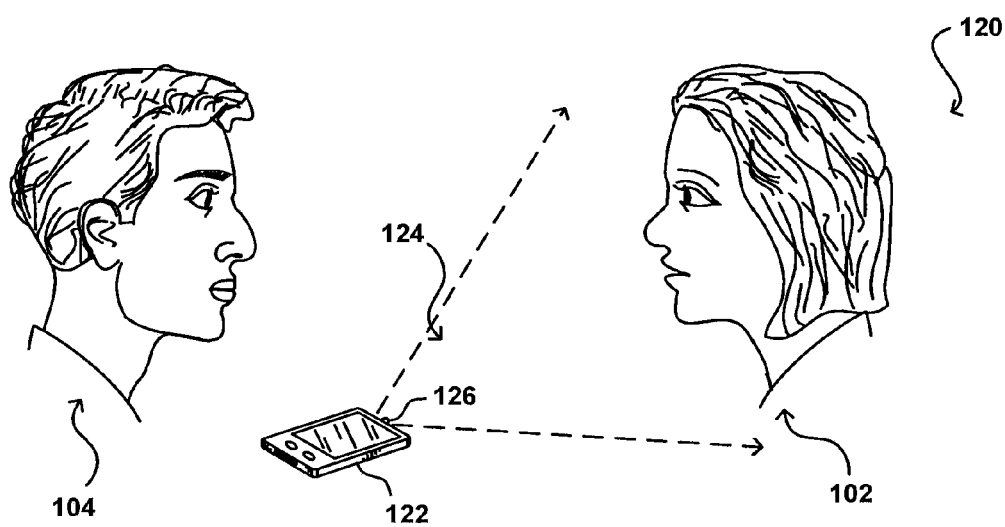

Accordingly, FIG. 1(b) illustrates an example situation 120 wherein an electronic device includes at least one imaging element 126 on a side or edge of the device 122. Using such a configuration, the device can be kept at a relatively oblique angle, such as may be substantially parallel to the floor, which can be minimally intrusive and may not even be noticeable by the other person. In some cases, the device might even be sitting on a table and not in contact with the user. Having at least one imaging element on the edge or side enables the viewable range 124 of the imaging element 126 to still include the person 102 to be imaged while providing a lower likelihood of distraction or even detection.

In one embodiment, a user can hold the device such that at least one selected imaging element is facing a person or object to be identified, and can receive any information determined by the device (or a system or service in communication with the device) to potentially be of interest to the user with respect to the object. In other embodiments, a user might perform one or more actions to indicate an object to be imaged or identified. For example, if the device has at least one imaging element positioned so as to track the gazing direction of the user, the user can gaze at the device, then a person to be identified, and then back at the device. Such a chain of gaze actions can cause the device to attempt to identify a person or object located in the direction the user was looking, and provide identifying information to the user in response. Approaches to determining the gaze direction of a user are described, for example, in co-pending U.S. patent application Ser. No. 12/786,297, filed May 24, 2010, and entitled "Determining Relative Motion as Input," which is hereby incorporated herein by reference. Similar other identifying methods can be used as well, such as a user pointing or nodding in a particular direction, flicking or tilting a device, sliding a finger in a certain direction on a touch sensitive surface of the device, etc.

Figure 2:
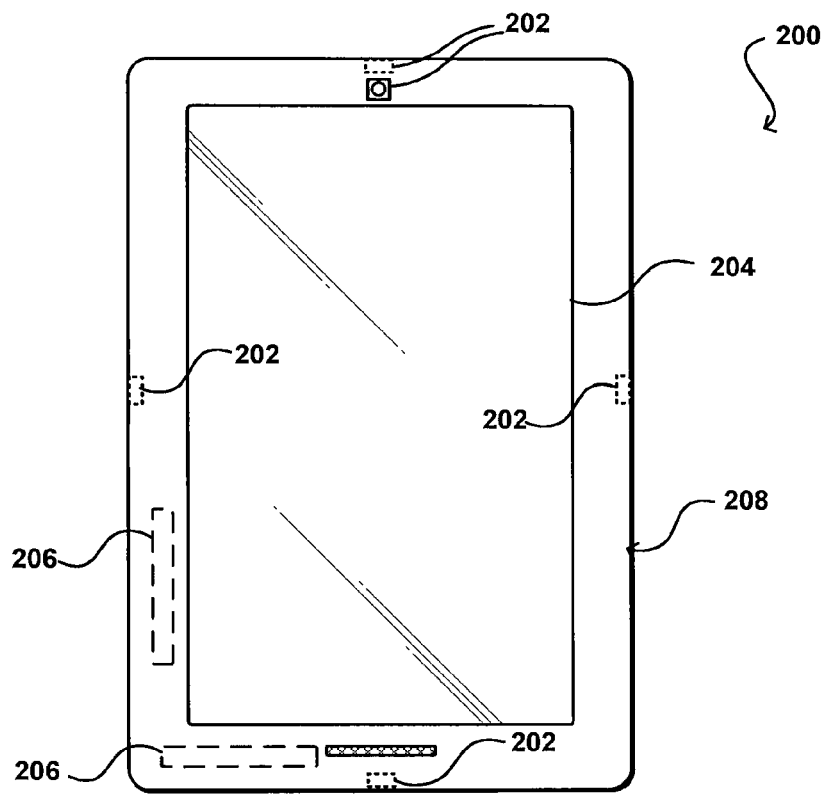
FIG. 2 illustrates an example device that can be used in accordance with various embodiments.

FIG. 2 illustrates an example of a portable electronic device 200 that can be used with various embodiments discussed herein. The example electronic device 200 includes conventional computing elements, such as a processor and memory, as discussed in more detail below with regard to FIG. 3, as well as at least one display element 204. The electronic device 200 may also include one or more orientation detection elements 206 included within a device housing 208. The display element 204 can comprise a display screen, touch-sensitive or otherwise, which can display various graphical elements as part of a graphical user interface (GUI). A GUI can enable the user of the client device to input various characters or text, select various elements or commands or provide another such input, using various approaches discussed herein and known in the art for such purposes.

The electronic device also includes a plurality of image capture elements 202. The image capture elements are located at positions around the device, such as on the front, back, and sides of the device. Other devices can include capture elements in other locations, and can include any desired or appropriate number of capture elements in the various embodiments. In some embodiments, an image capture element 202 may be a charge coupled device (CCD), a digital still camera or a video camera and may include a lens for altering the field of view of the image capture element 202. In other embodiments, at least some of the image capture elements 202 may be infrared or other image capture elements. In this example, image capture elements 202 are located on the edges of the device such that a user can capture images from the device in multiple directions without having to hold the device upright and/or change the orientation of the device during or between image capture.

The orientation detection element(s) 206 (e.g., an accelerometer, inertial sensor, or gyro element) can be used to determine orientation, motion, or other movement or changes in orientation of the client device 200. As discussed elsewhere herein, such elements can be useful in determining which image capture elements 202 to activate at a given time. The client device can also include at least one other conventional input mechanism (not shown), such as one or more user input elements (e.g., buttons, pressure-sensitive surface, squeeze input, capacitive input), positioned at any appropriate location on the client device, such as the front surface as in conventional devices (e.g., as part of a keyboard or keypad) or the side or back surface of the device such that a user holding the client device would likely be able to press or otherwise activate the button(s) without having to substantially shift hand positions. Various other input elements can be used as well, such as an audio input using a microphone or other such element.

Figure 3:
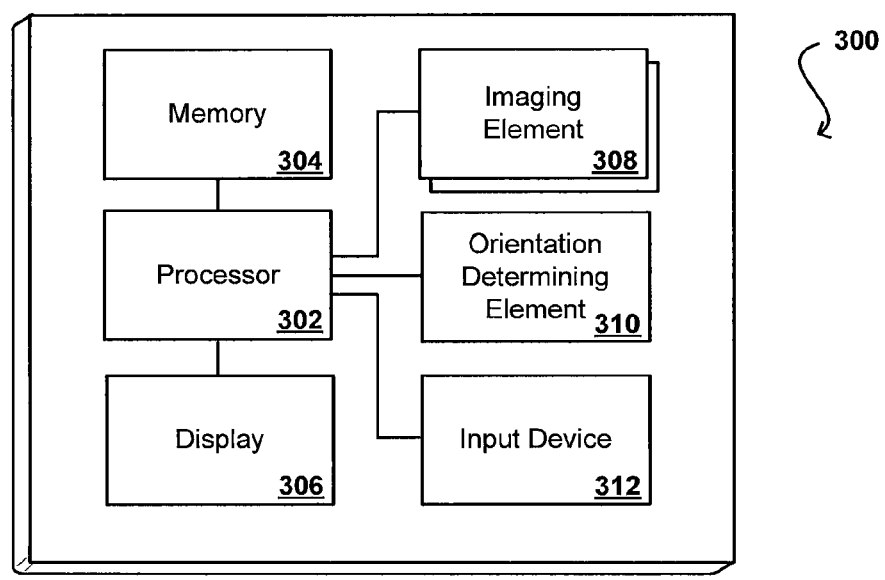
FIG. 3 illustrates an example configuration of components that can be used in a device such as that illustrated in FIG. 2.

FIG. 3 illustrates example components of a computing device 300, such as the client device 200 shown in FIG. 2. In this example, the device includes a processor 302 for executing instructions that can be stored in a memory device or element 304. As is known in the art, the device can include many types of memory, data storage or computer-readable media, such as data storage for program instructions for execution by the processor 302, a separate storage for images or data, a removable memory for sharing information with other devices, etc. The device typically will include some type of display element 306, such as a touch screen or liquid crystal display (LCD), although devices such as portable media players might convey information via other means, such as through audio speakers. In addition, the device may acquire many different types of information (e.g., location, presence, identity etc.) and provide this information to another device with a display element.

The device can include multiple image capture elements 308 located on different sides, edges, or other portions of the device. An image capture element 308 may be, by way of example only, an ambient light camera, infrared (IR) transceiver, or any combination thereof. An image capture element can include any appropriate optical element useful in providing sufficient angular spread, focal range and viewable area to capture one or more images of a user of the device, an intended target and/or devices positioned around the client device within a given range. Methods for capturing images using one or more image capture elements with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

At least one orientation detection element 310 is able to determine and/or detect orientation and/or movement of the device 300. Methods for using elements such as accelerometers to determine orientation or movement of a device are also known in the art and will not be discussed herein in detail. In some embodiments, the device can include at least one additional input element 212 able to receive input from a user. An input element can include, for example, a push button, touch pad, touch screen, touch-sensitive material, wheel, joystick, keyboard, mouse, keypad or any other such device or element whereby a user can input a command to the device. A client device may also include a microphone or other audio capture element that accepts voice or other audio commands. In this case, a device could be controlled through a combination of visual and audio commands, such that a user can control the device without having to physically contact the device.

Figure 4:
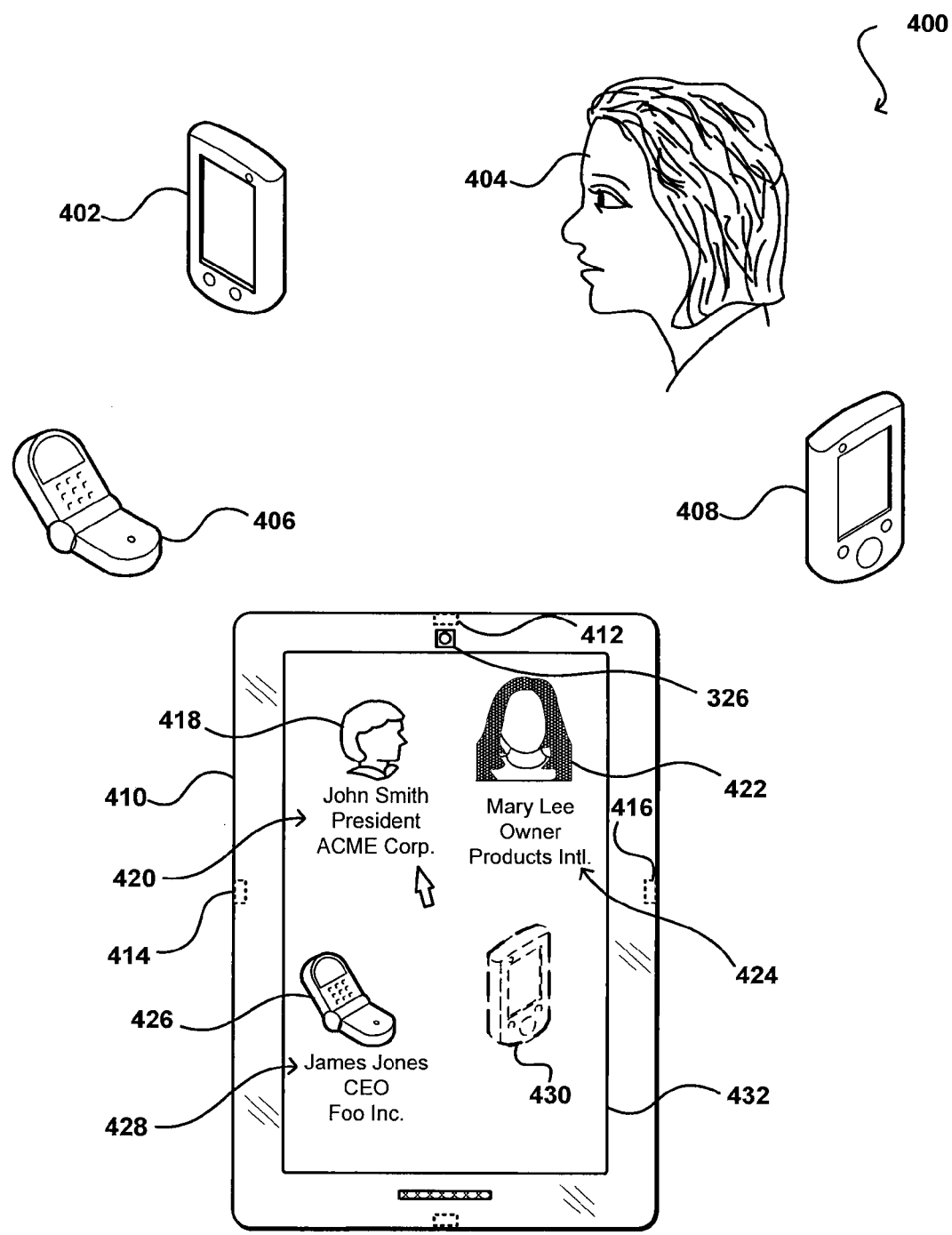
FIG. 4 illustrates an example interface display for imaged devices or users that can be used in accordance with various embodiments.

As mentioned, an electronic device with one or more imaging elements on at least one side of the device can simultaneously capture information in multiple directions around the device. For example, an electronic device 410 in the situation 400 of FIG. 4 is able to utilize three of the image capture elements 412, 414, 416 to capture information about devices

402, 406, and 408 and person 404. If the device only had a camera on the back as in conventional devices, the user of the electronic device 410 would have to hold the device upright and pan the camera to capture information about all these objects. In this example, the image information can be captured and analyzed to attempt to determine the identify of specific people, as may be provided by an application selected by the user and executing on the device. As mentioned, the device can include image recognition software that can be used, for example to determine the identity of a person using facial recognition. In this example, the device is able to capture image information of a nearby person 404, perform facial recognition, and determine a matching identity for that person. This information 424 then can be displayed to the user, here in the approximate relative location of the identified person.

Similarly, the device can attempt to identify users based on other captured information. For example, the device is able to determine identity information 420, 428 based at least in part upon image information captured of devices 402, 406 associated with specific users. In some embodiments, the electronic device might be able to determine the identity information based on the image information alone, such as where there is a bar code or other identifier on one of the imaged devices. In other embodiments, an algorithm might be able to recognize a type of device which might then be associated with information received over a sideband channel, such as over a WiFi or Bluetooth® connection. If the device is not able to determine an identity, or does not have image information for the identified user, the device might display an image of the device 426, 430 or another selected representation. If the user is recognized and image information is available, the device might display an image 418, 422 of each person, either stored for that person on either person's device or as captured by the image capture elements.

Figure 5A:
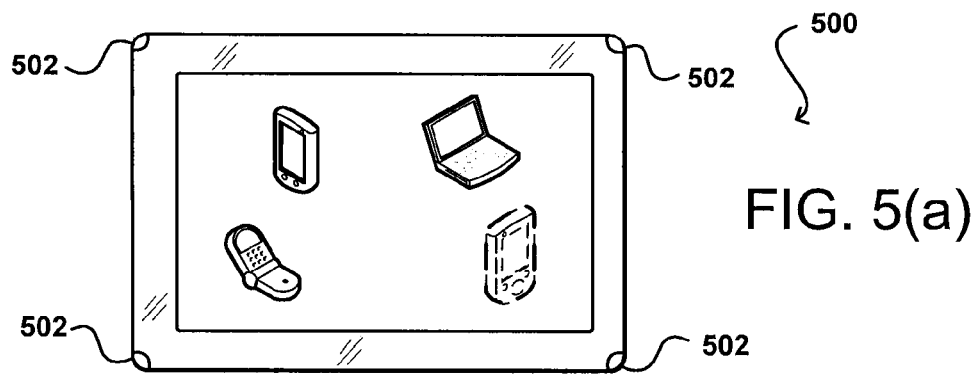
FIGS. 5(a)-5(c) illustrate example device configurations that can be used in accordance with various embodiments.
Figure 5B:
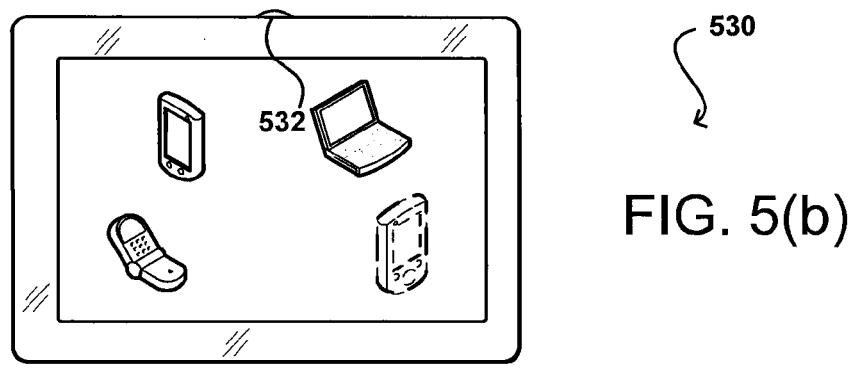
Figure 5C:
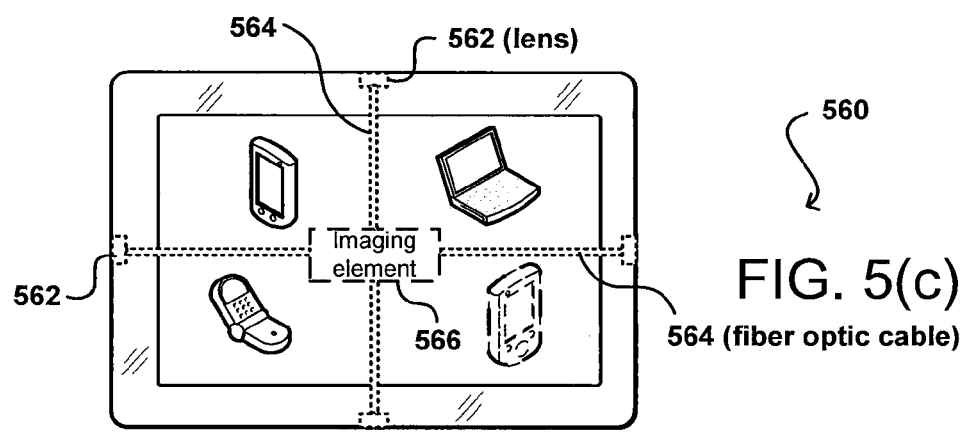

As mentioned, different devices can have different numbers and/or arrangements or image capture elements. For example, FIGS. 5(*a*)-5(*c*) illustrate example electronic devices with different configurations of image capture elements. FIG. 5(*a*) illustrates an electronic client device 500 including four image capture elements 502. Each image capture element 502 is positioned on one of the corners of the electronic device 500. Each image capture element 502 may have a similar, or varying, field of view. For example, the field of view for each image capture element might be less than 180 degrees, while in some embodiments one or more of the image capture elements may be a wide angles lens (e.g., fisheye lenses) that has a field of view of 180 degrees or more. Having two image elements on a common side of the device enables stereoscopic image capture as discussed elsewhere herein. In some embodiments, a set of imaging devices with fisheye lenses can be used to capture image information around the device using fewer elements than would be necessary using conventional imaging elements on each side of the device.

In some embodiments, two or more imaging elements on the same side or edge of a device, or on corners of a common side, can include a number of optical elements to ensure that there is at least some overlap of the field of view of the elements. In one embodiment, cameras on the top corners of a device are essentially angled inward (through the position of the elements, the optical elements directing light to the elements, or a combination thereof) in order to enable the cameras to look "across" the device and collectively cover a relatively wide angle. In one embodiment, there are four lenses used do adjust the effective viewing range of each device such that a significant portion of the viewing ranges overlap. Such an approach can ensure that there are no "dead zones" around the device from which image information cannot be captured, and can enhance stereoscopic and other types of image capture where the overlap permits.

FIG. 5(*b*) illustrates an example electronic device 530 with a single image capture element 532 on an edge of the device. A client device with a single image capture element will capture images only within the field of view of the single image capture element, but placing the image capture element on an edge reduces the intrusion necessary when adjusting the device such that an object is within a viewable range of the camera. In some embodiments, a single camera might have one or more moveable portions or optical elements such that the viewable range can be adjusted to different regions relative to the device, such as on the front, the back, or a side of the device. Such a camera might be adjusted manually or automatically in different embodiments.

FIG. 5(*c*) illustrates another example configuration of a client device. The client device 560 includes a single imaging element 562 and four lenses 564. Each lens 564 in the client device 560 may have a similar or varying field of view. Each lens 564 is connected to the imaging element 562 by, for example, a light tube 566. A light tube 566 may be, by way of example only, a fiber optic cable, a tube lined with highly reflective material, or any other device or element known in the art for transporting light/signals from one location to another. Each light tube 566 is used for transporting or distributing light entering a lens 564 to the imaging element 562. In some embodiments, a lens 564 is a shutter device that allows light to pass through the lens for a determined period of time, for the purpose of exposing the imaging sensor to light to capture an image. In this instance, the client device 560 may be able to control and coordinate the operation of each lens 564 for capturing one or more images. One advantage of client device 560 is reduced cost of a single imaging element.

Figure 6:
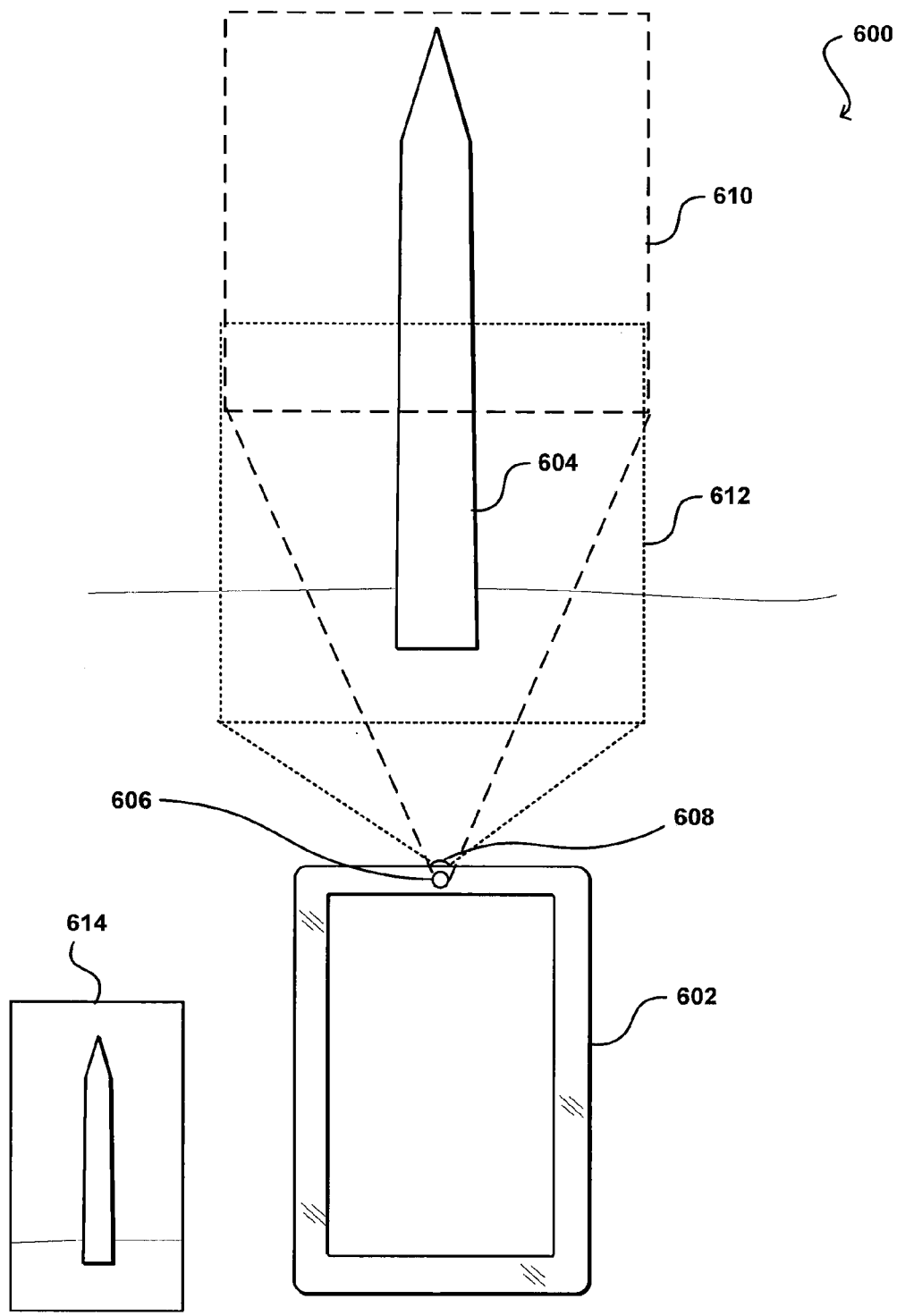
FIG. 6 illustrates an example image capture that can be used in accordance with various embodiments.

The positioning of camera elements on different areas of the device also provide for other types of simultaneous image capture. For example, FIG. 6 illustrates an example situation 600 where the user is at a location where the field of view of a single image capture element is not sufficient to capture all the desired information, here corresponding to a monument or obelisk 604. By simultaneously capturing information from multiple camera elements 606, 608 on different sides of the device 602, the captured images for the field of view 610, 612 of the camera elements can be stitched together to a single image 614 including the desired information. The ability to do simultaneous image capture avoids gaps or other problems due to movement of the device, and avoids problems with movement of the object being imaged (e.g., kids or athletes) during times between the image capture at different locations.

Figure 7A:
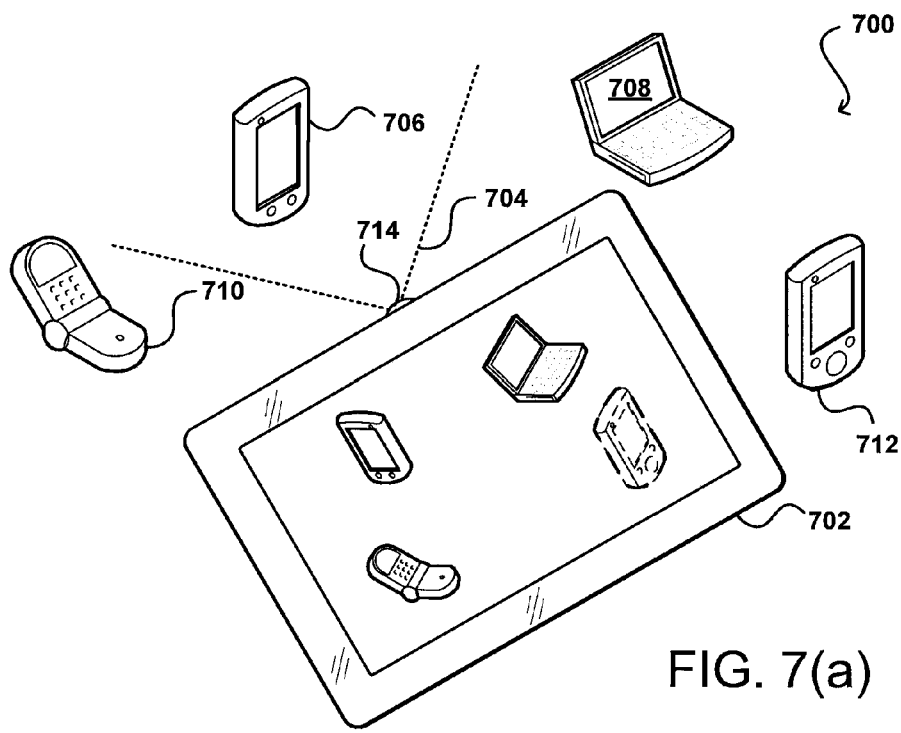
FIGS. 7(a)-7(b) illustrate example processes for locating and identifying at least one of a plurality of devices that can be used in accordance with one embodiment.
Figure 7B:
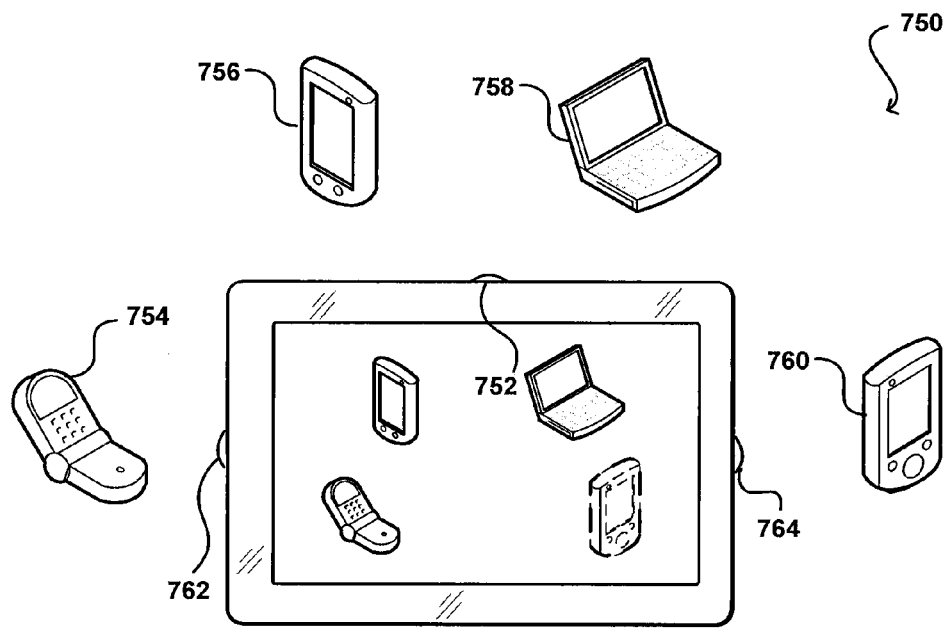

As mentioned, in some embodiments the user, device, or an application can select which image capture element to use. For example, in the situation 700 of FIG. 7(*a*) a single image capture element 714 is activated and a user must rotate the device 702 in order to capture image information for the nearby devices 706, 708, 710, 712 using the active element. In the situation 750 of FIG. 7(*b*), on the other hand, the user can tilt the device to activate different cameras to capture specific information. For example, the user might tilt the device forward to capture image information for two devices 756, 758 using image capture element 752, might tilt the device to the left to capture image information of device 754 using capture element 762, and might tilt the device to the right to capture image information of device 760 using capture element 764. As mentioned, various other actions or inputs can be utilized to select image capture elements to activate, such as by pointing, gesturing, glancing, selecting GUI element, etc.

Figure 8:
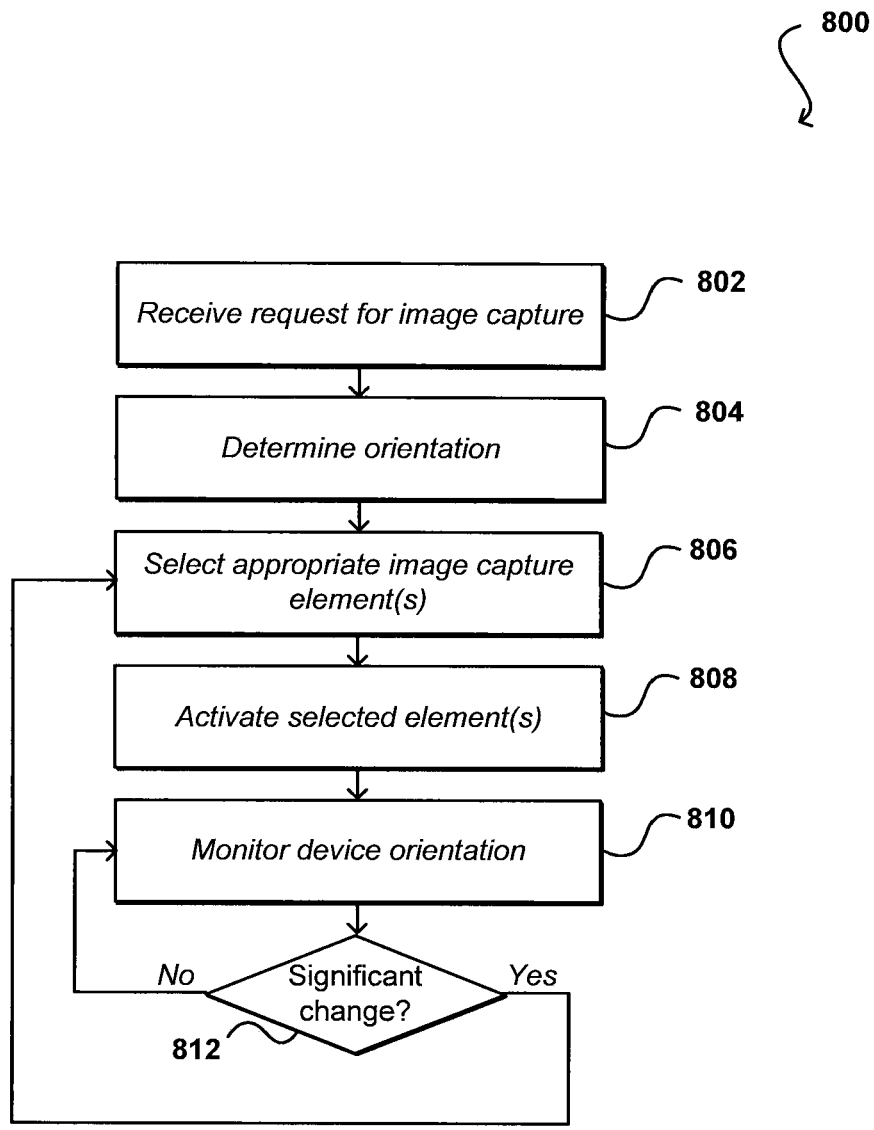
FIG. 8 illustrates an example process for capturing information using a side-mounted camera that can be used in accordance with various embodiments.

FIG. 8 illustrates an example process 800 for capturing image information using various image capture elements of an electronic device. It should be understood that there can be additional, fewer, or alternative steps performed in similar or alternative orders, or in parallel, in accordance with the various embodiments unless otherwise stated. In this example process, a request for image capture is received 802. This request could be from any appropriate source or in response to any appropriate action, such as an application being executed or a user making a specific gesture, as discussed and suggested elsewhere herein. In this example process, the current orientation of the device is determined 804. As discussed, this can include using an orientation-determining element such as an electronic gyroscope to determine the current orientation of the device, although other approaches such as image analysis or voice detection can be used as well in other embodiments.

Based at least in part upon the current orientation as well as any other appropriate factor, such as the current application or task, or people or objects detected nearby, the device can select one or more appropriate image capture elements 806 and, at an appropriate time, activate the element(s) for image capture 808. During the imaging process the orientation of the device can be monitored 810, and if there is a significant change 812, such as a change over a certain amount or tilt or rotation or with another threshold amount of adjustment, for example, another appropriate element can be selected and/or activated as appropriate. As mentioned, the image capture process can continue depending upon the task or application, and the image information can be analyzed using any appropriate algorithm or process for any appropriate purpose.

It should also be understood that other types of element can be advantageously placed on edges or sides of a device as well for similar or alternative purposes. For example, microphones and/or speakers can be placed on the edges of a device to selectively record or project audio to/from a particular direction in a relatively subtle manner. Similarly, projection or biometric elements can be placed on the edges of a device for various purposes.

Having image capture elements on the side of a device can be beneficial for other applications as well. For example, a user might use a device with a GPS system to enhance the directions, such as to adjust when the captured image information indicates construction or a red light. By having a camera on a side of the device, the user can place the device on the dashboard of a car instead of having to mount the device in a "straight up" orientation which can potentially block part of the user's view. Similarly, a user can capture image information with the device on a table or desk, without having to hold the device in a specific orientation for an extended period of time.

Using multiple cameras also enables stereoscopic image capture and two- or three-dimensional (3D) environment or object modeling. In some embodiments, a device can have cameras positioned to capture image information in any direction about the device. A user then can potentially capture any image information of nearby objects, in two or three dimensions, without having to move the device.

In some embodiments, a device can attempt to determine some information about its surroundings to assist in selecting one or more image capture elements to activate. For example, a device with touch or pressure sensitive material about a periphery of the device can attempt to determine when a user is holding a device to determine which elements to activate. Similarly, a device might use a light and/or proximity sensor to determine which side(s) of the device are against a surface, in a pocket, etc. Various other components or approaches can be used as well, which can attempt to determine which directions around the device are likely of interest, likely to not produce any useful information, etc.

In some embodiments, the device can identify the location of an object and select the element(s) to activate based at least in part upon that location. For example, a device might recognize a person to be tracked and activate one or more elements to capture information about that person. In some embodiments, the device can track the location of that person and activate different elements as necessary to continue to capture images of the user during the movement. In other embodiments, a device might be configured to locate persons in a meeting who are not known to the user, such as may otherwise be stored as contacts for the user, and provide information about those persons to the user. In some embodiments, a device might be configured to locate certain types of objects, such as birds or animals, and capture image information about those objects using the appropriate image capture elements. Various other device-based selections can be used as well in accordance with various embodiments.

In at least some embodiments, the user can have the option of manually overriding any imaging element selection made by the device. The user can select to always utilize a certain camera for a certain action or orientation, or can provide one or more inputs to select a different camera upon a selection by the device. An application or remote service also can have the ability to select and/or override such selections.

In addition to not distracting persons nearby, the ability to capture image information using side cameras can have advantages in other situations as well. For example, a parent might want to take pictures of a child doing something. In many instances, a child might modify a current behavior if the child notices that a picture or video is being taken. By utilizing a side camera of a device, the device can be positioned in an orientation such that the child may not be able to tell that he or she is being imaged.

In another example situation, a user might be shopping in a store and trying to get information about various products offered for sale. The device might be able to capture and analyze image information for a product, then display information such as pricing and review information. Using a conventional device, the user would have to walk around with the device upright which can partially block the user's view, and might make the user uncomfortable based on others being around and observing such behavior. By being able to use a side camera, the user can be more discrete when browsing, and can have the ability to see all the products on a shelf without obstruction by the device.

Figure 9:
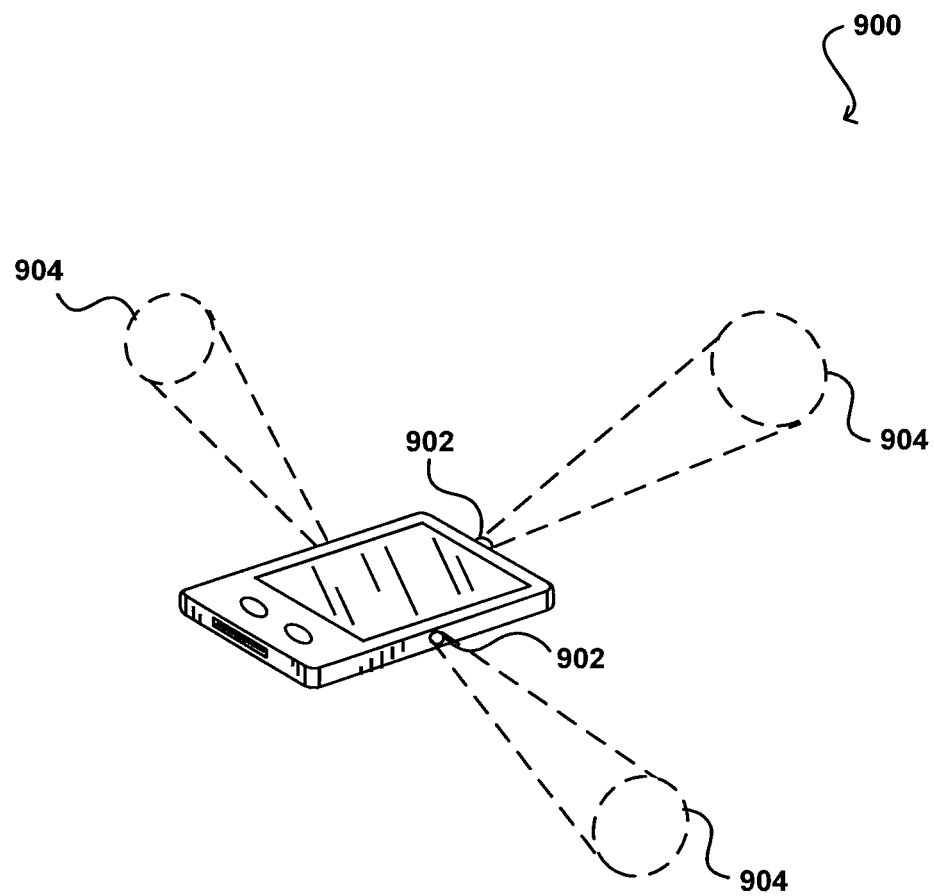
FIG. 9 illustrates an example embodiment wherein an electronic device includes multiple projection elements on different sides of the device that can be used in accordance with various embodiments.

If the device has a projector on at least one side, the device can utilize a projection to identify the item being imaged and/or for which information is currently being provided. Using approaches similar to those discussed above, a user or device can select among various projection elements as necessary to obtain the desired functionality. For example, FIG. 9 illustrates an example device 900 including projection elements 902 on multiple sides of the device. In some embodiments, the user or device can select at least one of the elements 902 to project an image 904, which in at least some instances could be projected by any of the projection elements. The projection element could be selected using criteria similar to those used to select imaging elements, such as by using an orientation of the device, movement of the device or user, etc. In some instances, the projections can at least partially overlap enabling the device to project two- or three-dimensional images. Such an approach enables a device to potentially project information in any direction independent of the orientation of the device and/or without moving or orienting the device in a particular way.

A number of other applications and/or uses for which side-mounted elements might be advantageous are provided in co-pending U.S. patent application Ser. No. 12/763,118, filed Apr. 19, 2010, and entitled "Approaches for Device Location and Determination," which is hereby incorporated herein by reference.

Figure 10:
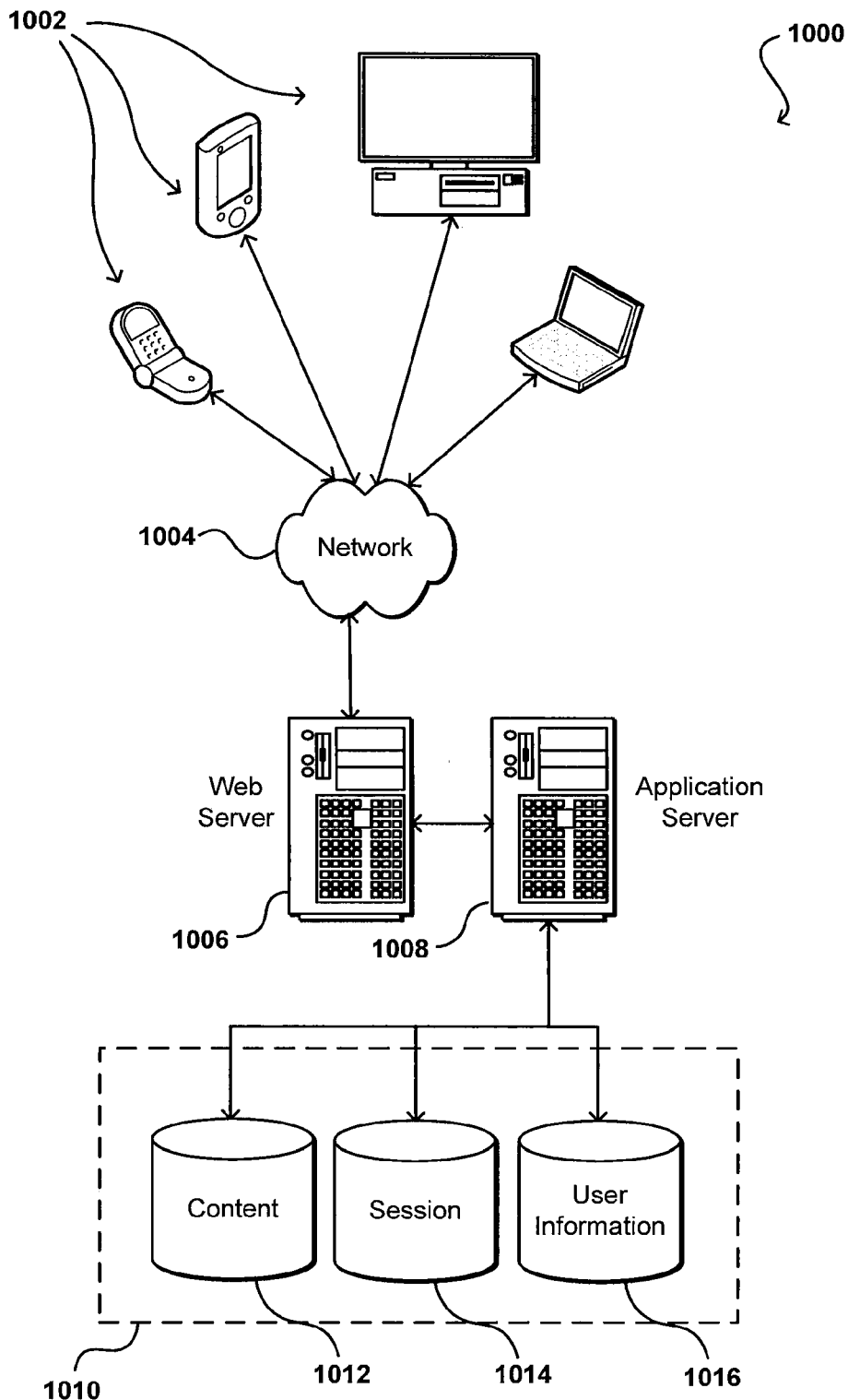
FIG. 10 illustrates an example environment in which various embodiments can be implemented.

In accordance with the various embodiments discussed above, various environments and technologies can be utilized as appropriate or desirable for various applications. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The environment 1000 shown includes a variety of client devices 1002, which can include any appropriate device operable to send and receive requests, messages or information over an appropriate network 1004 and convey information back to a user of the device. As discussed, at least some of these devices can also include components enabling the devices to communicate directly with each other via wireless communication. Examples of such client devices include personal computers, cell phones, handheld messaging devices, laptop computers, set-top boxes, personal data assistants, electronic book readers and the like. Each client device can be capable of running at least one motion or orientation-controlled interface as discussed or suggested herein. In some cases, at least some functionality will be generated and/or managed on at least one client device. In other embodiments, at least some of the functionality or content will be generated and/or managed over at least one network 1004.

The network 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a content provider system including at least one Web server 1006 for receiving requests from a client device 1002 and serving content in response thereto, although for other networks an alternative device serving a similar purpose could be used as would be apparent to one of ordinary skill in the art.

The provider system can also include at least one application server 1008 or other such server in communication with at least one data store 1010. It should be understood that there can be several application servers, layers and/or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. An application server can include any appropriate hardware and software for integrating with the data store as needed to execute aspects of one or more applications for the client device and handle a majority of the data access and business logic for an application. The application server provides access control services in cooperation with the data store and is able to generate content such as text, graphics, audio and/or video to be transferred to the user, which may be presented to the user by the Web server in the form of HTML, XML, or another appropriate structured language in this example. The handling of all requests and responses, as well as the delivery of content between the client device 1002 and an application server 1008, can be handled by the respective Web server 1006. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, a content data store 1012 as illustrated includes content that might be accessed or shared by a user of a client device. The user data store 1016 includes identification data and/or security information useful for validating specific users or associating users with specific devices. A session data store 1014 can store any appropriate information for a session, such as which devices participated or were detected, what information was obtained for each device, etc. It should be understood that there can be many other aspects that may need to be stored in a data store, such as access rights information, which can be stored in any of the above listed mechanisms as appropriate or in additional mechanisms in the data store. Each data store is operable, through logic associated therewith, to receive instructions from a respective application server and obtain, update or otherwise process data in response thereto. In one example, a user might submit a search request for a certain type of content. In this case, the data store might access the user information to verify the identity of the user and can access the content information to obtain information about instances of that type of content. The information can then be returned to the user, such as in a message or on a Web page that the user is able to view via a browser on the client device 1002.

Each server will typically include an operating system that provides executable program instructions for the general administration and operation of that server and will typically include a computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected, via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response to requests from user devices, such as by executing one or more Web applications that may be implemented as one or more scripts or programs written in any programming language, such as Java®, C, C# or C++ or any scripting language, such as Perl, Python, or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium, representing remote, local, fixed and/or removable storage devices as well as storage media for temporarily, and/or more permanently, containing, storing, transmitting and retrieving computer-readable information. The system and various devices will also typically include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. For example, even though the client device was described throughout as a portable electronic device, the technology described herein may also apply to a non-portable electronic device (e.g., desktop computer, game console).

What is claimed is:

1. A method of identifying an object, comprising:
activating an image capture mode on an electronic device, the electronic device including a plurality of image capture elements, at least one of the image capture elements being positioned at an edge of the electronic device;
determining an orientation of the electronic device using at least one orientation-determining element of the electronic device;
based at least in part upon the determined orientation, selecting at least one of the image capture elements to capture image information;
analyzing the captured image information to identify at least one object at least partially contained in the captured image information; and
providing information about the at least one object on a display element of the electronic device when the at least one object is identified;
wherein the device is operable to display information about an object near the electronic device without the electronic device having to be in a specific orientation with respect to the object,
wherein the method is performed by one or more computing devices.

2. The method of claim 1, wherein the orientation-determining element includes at least one of an accelerometer, inertial sensor, or electronic gyroscope.

3. The method of claim 1, further comprising:
   detecting a change in orientation of the electronic device; and
   selecting at least one different image capture element based at least in part upon the detected change in orientation.

4. The method of claim 1, wherein the at least one image capture element includes at least one still camera or video camera.

5. The method of claim 1, further comprising:
   determining at least one of a direction of gaze, gesture, or motion of a user of the electronic device; and
   selecting at least one of the image capture elements to capture image information based further on the at least one determined direction.

6. The method of claim 1, wherein the object is a person, and
   wherein the information about the object includes at least one of a name of the person, an occupation of the person, an employer of the person, a picture of the person, and personal information about the person.

7. The method of claim 1, wherein the object includes an identifier enabling the electronic device to identify the object.

8. A method of capturing image information, comprising:
   activating an image capture mode on an electronic device, the electronic device including at least four image capture elements positioned at different sides of the electronic device;
   determining an orientation of the electronic device using at least one orientation-determining element of the electronic device;
   receiving input indicating image information to be captured;
   based at least in part upon the determined orientation and the image information to be captured, selecting at least one of the image capture elements to capture image information;
   wherein the device is operable to selectively capture image information in multiple directions around the device without reorienting the device;
   wherein the method is performed by one or more computing devices.

9. The method of claim 8, wherein the input corresponds to at least one of a gesture, motion, or gaze direction of the user.

10. The method of claim 8, wherein the input corresponds to a change in orientation of the device.

11. The method of claim 8, wherein four image capture elements are positioned on four corners or edges of the electronic device.

12. The method of claim 8, wherein at least two of the image capture elements have at least partially overlapping fields of view.

13. The method of claim 8, wherein the device includes one camera element, and
    wherein the image capture elements include lenses optically connected to the camera element.

14. The method of claim 8, further comprising:
    determining whether a user is holding the device; and
    selecting at least one of the image capture elements to capture image information based further upon whether the user is determined to be holding the electronic device.

15. The method of claim 8, further comprising:
    using at least one of a light sensor or a proximity sensor to determine one or more image capture elements to exclude from consideration for selection.

16. The method of claim 8, wherein the at least one capture element is operable to capture images using at least one of ambient light and infrared radiation.

17. A method of capturing image information, comprising:
    activating an image capture mode on an electronic device, the electronic device including a plurality of image capture elements positioned at different sides of the electronic device;
    detecting a change in orientation of the electronic device; and
    based at least in part upon the change in orientation, selecting at least one of the image capture elements to capture image information;
    wherein a user of the electronic device is able to select an image capture element on a selected side of the device to capture image information by changing an orientation of the device;
    wherein the method is performed by one or more computing devices.

18. The method of claim 17, wherein the change in orientation is one of a tilt, shift, translation, rotation, or flick of the electronic device in an approximate direction.

19. The method of claim 17, wherein the change in orientation is detected using at least one of an accelerometer, electronic gyroscope, electronic compass, or inertial sensor of the electronic device.

20. An electronic device, comprising:
    a processor;
    a plurality of image capture elements, at least a portion of the plurality of image capture elements being positioned at multiple sides of the electronic device; and
    a memory element including instructions that, when executed by the processor, cause the electronic device to:
       activate an image capture mode on an electronic device;
       detect a change in orientation of the electronic device; and
       select at least one of the image capture elements to capture image information based at least in part upon the change in orientation,
    wherein a user of the electronic device is able to select an image capture element on a selected side of the device to capture image information by changing an orientation of the electronic device.

21. The electronic device of claim 20, wherein the change in orientation is one of a tilt, shift, translate, rotate, or flick of the electronic device in a specific direction.

22. The electronic device of claim 20, further comprising:
    at least one orientation-determining element for detecting the change in orientation of the electronic device.

23. The electronic device of claim 22, wherein the orientation-determining element includes at least one of an accelerometer, electronic gyroscope, electronic compass, or inertial sensor.

24. The electronic device of claim 22, wherein at least one of the plurality of image capture elements includes a wide angle or fish eye lens.

25. An electronic device, comprising:
    a processor;
    a display element;
    a plurality of image capture elements, at least a portion of the plurality of image capture elements being positioned at multiple sides of the electronic device; and
    a memory element including instructions that, when executed by the processor, cause the electronic device to:

activate an image capture mode on an electronic device;

determine an orientation of the electronic device using at least one orientation-determining element of the electronic device;

based at least in part upon the determined orientation, select at least one of the image capture elements to capture image information;

analyze the captured image information to identify at least one object at least partially contained in the captured image information; and provide information about the at least one object on the display element when the at least one object is identified, wherein the electronic device is operable to display information about an object near the electronic device without the electronic device having to be in a specific orientation with respect to the object.

26. The electronic device of claim 25, wherein the instructions when executed further cause the electronic device to:

determine a gaze direction of a user of the electronic device; and select at least one of the image capture elements to capture image information based further on the determined gaze direction.

27. The electronic device of claim 25, wherein the instructions when executed further cause the electronic device to:

receive input regarding image information to be captured; and select at least one of the image capture elements to capture image information based further upon the image information to be captured.

* * * * *